BIT ORGANIZED CRYOGENIC MEMORY CELL

Filed Dec. 18, 1964

Inventors:
Vernon L. Newhouse,
Harold H. Edwards,
by John P. Dellitt
Their Attorney.

BIT ORGANIZED CRYOGENIC MEMORY CELL

Inventors:
Vernon L. Newhouse,
Harold H. Edwards,
by John P. Dellitt
Their Attorney.

United States Patent Office 3,359,545
Patented Dec. 19, 1967

3,359,545
BIT ORGANIZED CRYOGENIC MEMORY CELL

Vernon L. Newhouse and Harold H. Edwards, Schenectady, N.Y., assignors to General Electric Company, a corporation of New York Filed Dec. 18, 1964, Ser. No. 419,430
7 Claims. (Cl. 340—173.1)

ABSTRACT OF THE DISCLOSURE

A cryotron memory cell for a bit-organized random access memory comprising Y and X lines branching into first and second loop circuits respectively, with the first branch of the X line in cryotron grid relation to a first branch of the Y line and the Y line in cryotron grid relation to the second branch of the X line. The first loop circuit stores a persistent current when both lines are simultaneously pulsed, and a voltage is produced on the first line when both lines are again simultaneously pulsed but with reversed X current. In each loop circuit, inductance of the second branch extends that of the first branch.

This invention relates to a cryogenic memory cell and particularly to such a cell employed in a bit organized memory array.

Cryogenic or superconducting circuit elements are of particular value in computer equipment having repetitious organization. For example, a computer memory involving a large number of memory locations can be accommodated in a smaller volume if the memory is of the superconducting type. Then, miniaturization and high packing density are possible because of the lossless nature of superconducting elements.

Heretofore superconducting memories have been largely of the catalog or associative type wherein information is stored and retrieved in blocks or words. However, a random access or bit-by-bit organization, wherein memory locations store single digits, is more flexible for usual memory purposes. Prior cryogenic memory cells are not well adapted to a bit-by-bit organization because of the plurality of control conductors required in operating such superconducting memory cells. In a cryogenic memory including a matrix of cells of the prior type, more than one control conductor has been required in each matrix direction, leading to each memory cell, in order to operate the cell and provide input and output therefor. The number of conductors thus employed render memory construction more difficult, decreasing packing density, and introducing increased inductance when such operating lines must extend from one memory plane to another.

It is therefore an object of the present invention to provide an improved bit-organized cryogenic memory and cell therefor.

It is another object of the present invention to provide an improved cryogenic memory cell accessible from as few as two coordinate conductors together uniquely defining the position of such cell.

In accordance with the present invention, a bit-organized random access memory includes, as a basic unit thereof, a destructive readout persistent current memory cell having two loop circuits, one connected in each of only two coordinate conductors uniquely defining the position or location of the cell. One of the branches of the loop circuit included in one drive line is disposed in cryotron grid relation to one of the branches of the other loop circuit included in the other drive line. In addition the said other drive line is disposed in cryotron grid relation to the remaining branch of the loop circuit included in the first mentioned drive line. The loop circuit included in the said other drive line acts to store information in the form of a circulating persistent current, entered therein when both lines are activated. This current is entered and destructively read out, only when current is coincidentally present in both coordinate drive lines. In the case of readout, the current in the drive line including the loop storing the persistent curent adds to the persistent current present therein. Current from the remaining drive line is diverted, by current in the drive line including the persistent current loop, whereby to quench the persistent current. The resulting voltage is read out via the drive line including the loop which contained the persistent current.

In accordance with an embodiment of the present invention, one of the loops includes a side conductor disposed over and along the other side conductor for the purpose of reducing the size of the memory cell and increasing packing density in the memory.

According to another aspect of the present invention the memory matrix includes a sensing means, connected across line-driving-means which actuate coordinate drive conductors in one matrix direction, to provide readout of the selected memory cell. A switching means is desirably included between the sensing means and the aforementioned coordinate drive conductor whereby to isolate the sensing means when information is not being read out.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
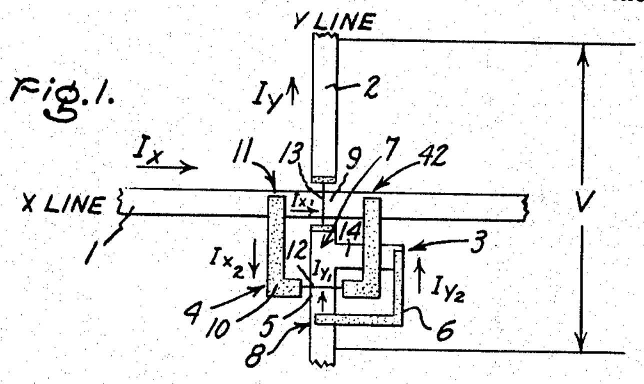
FIG. 1 is a top view of a memory cell in accordance with the present invention.

Referring to FIG. 1, an X drive line 1 and a Y drive line 2 of a cryogenic memory matrix intersect to define the location of a memory cell according to the present invention. This memory cell comprises a first loop or branched circuit 3 serially included in the Y drive line and a second loop or branched circuit 4 serially included in the X drive line. Loop circuit 3 includes a first branch 5 which may form an extension of the Y drive line and a second and longer branch 6 having more inductance than branch 5 principally because of its greater length and narrower width. Branches 5 and 6 extend between a first terminal area 7 on one end of the loop and a second terminal area 8 on the other end of the loop where the loop is connected in series with the Y drive line.

Second loop 4 includes a first branch 9 which may form an extension of the X drive line and a second branch 10 longer than the first branch and including a narrow control portion, and having more inductance principally for this reason. Branches 9 and 10 extend between a first terminal area 11 and a second terminal area 42 where the loop is connected in series with the X drive line.

The X and Y drive lines may be formed of a low critical field superconducting material such as tin while branch 10 of loop 4 is made of a relatively high critical field superconducting material, e.g. lead. Branch 5 of loop circuit 3 is also a low critical field superconducting material. The low critical field superconducting material is more susceptible to the influence of a magnetic field in producing the return of its resistance than is the high critical field superconductor. Branch 10 includes a narrow cryotron control grid 12 disposed in cryotron grid relation to, or overlying, branch 5 of loop circuit 3 wherein branch 5 is the cryotron gate. Current flow in branch 10 is capable of returning resistance in branch 5 because the magnetic field intensity resulting from current flow in the narrow grid 12 renders the underlying low critical field superconductor resistive. Y line, 2, serially includes a similar narrow cryotron grid 13, preferably formed of high critical field superconducting material, disposed in cryotron grid relation to branch 9 of loop circuit 4. Current flow in line 2 and therefore in grid 13, is also capable of rendering branch 9 resistive due to the intensity of the magnetic field flowing in grid 13. It is understood grids 12 and 13 are separated by a thin layer of insulation from the branch over which they pass.

By way of example, the memory cell according to the present invention may take the form of deposited layers upon a common insulated substrate (not shown) desirably including a grounded shield plane immediately adjacent but insulated from the conductors forming the memory cell. Lines 1 and 2 are conveniently deposited first, including an extension 14 of line 2 which forms a part of loop circuit 3. As hereinbefore mentioned the X and Y lines are conveniently low critical field superconducting material. In another deposition step, branch 10 of loop 4 including cryotron grid 12, is deposited as high critical field supreconducting material. Branch 10 overlaps X line, 1, in terminal areas 11 and 42 thereby establishing connection therebetween. At the same time, cryotron grid 13 is deposited across branch 9 including land areas at either end thereof for establishing electrical connection to Y line, 2. Also, the remaining portion of branch 6, conveniently formed of high critical field superconducting material, is deposited with its ends overlapping line 2 and extension 14 completing loop 3.

It is understood the memory cell according to the present invention is included as one of the large number of cells in a memory matrix having a multiplicity of coordinate X and Y lines with a memory cell located at each intersection. The entire memory matrix is refrigerated to a temperature at which the cell and coordinate conductors are superconducting aside from cryotron grid action. Only one X line and one Y line need be connected to operate a memory cell at their conjunction according to the present invention.

Figure 2:
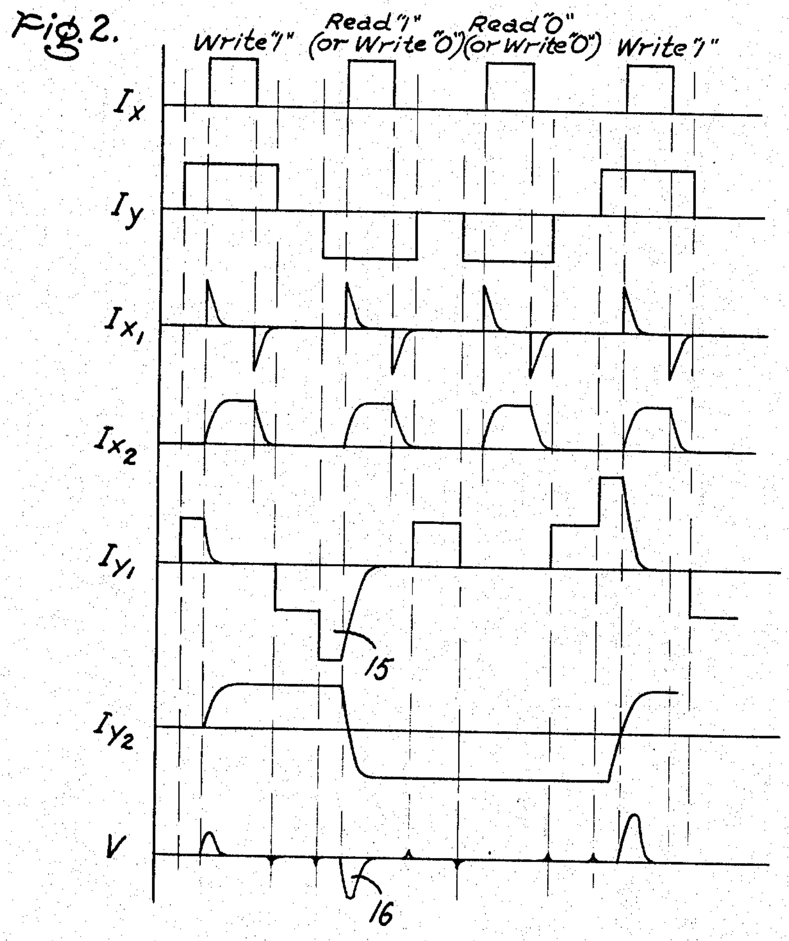
FIG. 2 is a chart of waveforms illustrating various operating modes of the cell according to the present invention.

To enter information into the memory cell, a pulse $I_x$ is switched on in the presence of a substantially simultaneous pulse $I_y$, as indicated on the waveform chart of FIG. 2. The inductances of branches 5 and 6 are such that $I_y$ initially flows almost entirely as $I_{y_1}$ in branch 5. Similarly, the inductances of loop 4 are such that current $I_x$ initially flows almost entirely as $I_{x_1}$ in branch 9. However, since $I_y$ flows in line 2 through cryotron grid 13, $I_x$ will be diverted into branch 10 as $I_{x_2}$. $I_{x_2}$, passing through cryotron grid 12, in turn switches current $I_y$ in line 2 from branch 5 to branch 6 as $I_{y_2}$. $I_x$ in line 1 is now turned off. The continued presence of $I_y$ prevents any persistent current from forming in loop circuit 4. When $I_{x_2}$ has decayed to zero, $I_y$ is switched off, and a persistent circulating current does flow in loop circuit 3. This persistent current flows downward in branch 5 and upward in branch 6 (i.e. counterclockwise) and is taken to represent the storage of a binary digit one.

To read out this information $I_y$ and $I_x$ are applied to the Y and X lines as before except the $I_y$ pulse is now negative, that is downward in line 2. X line current, $I_x$, is switched to branch 10 as before. However, before this switching takes place, the current in line 2, $-I_y$, being downward, combines with the circulating current in branch 5, also flowing in a downward direction, providing a double $-I_{y_1}$ current. This current is indicated at 15 in the FIG. 2 waveform chart. As the X line current, $I_x$, is switched to branch 10 as $I_{x_2}$, a voltage, V, occurs across branch 5 as this branch is rendered resistive with cryotron grid 12. The voltage, V, is indicated at 16 in the waveform chart and provides the output for the device. V is detected across the Y line as indicated in FIG. 1. At the same time, the Y line current, $I_y$, is switched to branch 6 as a $-I_{y_2}$. $I_x$ is turned off before $I_y$ so that the X loop current is quenched. When $I_y$ is turned off, a clockwise persistent current remains in the storage loop. This will be regarded as a stored binary zero. With this convention reading the cell results in the storage of "zero."

A zero is thus stored in the same manner as a binary one except a negative $I_y$ pulse is employed in line 2 for writing the zero. The circulating current in loop 3 is then clockwise instead of counterclockwise, the case of the stored one. Reading is again accomplished with a negative $I_y$ current pulse on line 2, and a concurrent $I_x$ current pulse. As indicated in the waveform chart of FIG. 2, no voltage pulse, V, is obtained when a zero is read.

In all reading operations, $I_y$ is applied before $I_x$ to allow the inductive voltage created by $I_y$ to decay before any resistive voltage appears.

The FIG. 2 waveform chart concludes with an example of operation in writing another one into the memory cell. Although a voltage, V, is generated at this time, it is understood such voltage present during the writing of the digit is ignored by the sensing equipment.

Figure 3:
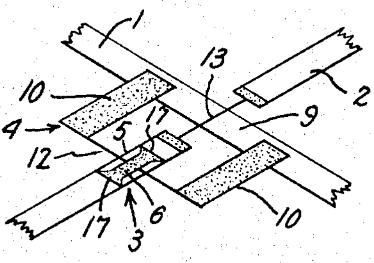
FIG. 3 is a view of a more compact cell arrangement according to the present invention.

A more compact version of the cell is illustrated in FIG. 3. In this embodiment, branch 6 of cell 3 is deposited longitudinally along and over branch 5 and cryotron grid 12. Branch 6 is insulated from grid 12 and branch 5 except in the end land areas 17 at either end of the branch where connection is made with branch 5. Branch 6, formed of high critical field material, is not rendered resistive due to the flow of a current, $I_{x_2}$, in cryotron grid 12. The construction and operation of the FIG. 3 embodiment is otherwise the same as hereinbefore described.

Figure 4:
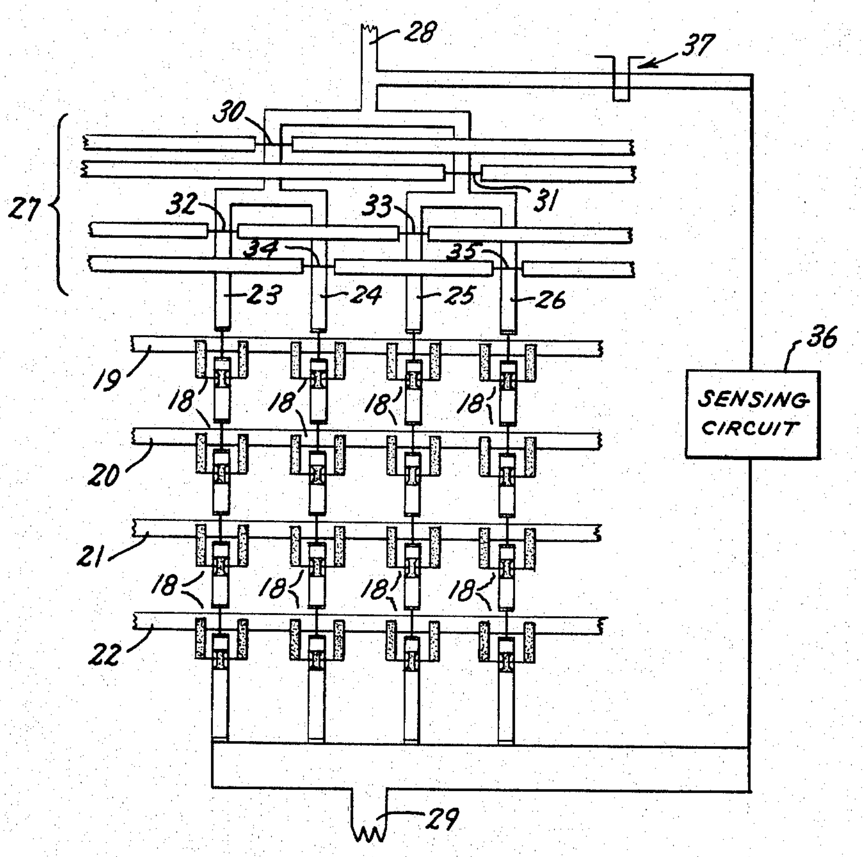
FIG. 4 is a schematic diagram of a memory array including the FIG. 3 memory cells and also illustrating addressing and readout means.

FIG. 4 illustrates a memory matrix including a plurality of FIG. 3 memory cells 18 disposed at the junction of coordinate X lines 19, 20, 21 and 22, and Y lines 23, 24, 25 and 26. For the purpose of writing information and sensing the information so written, only one X line and one Y line need be energized at a particular time. Their unique conjunction selects or addresses only one memory cell 18 containing one bit of information. An address switch 27 is illustrated for the Y lines only, it being understood that similar addressing means may be employed with respect to the X lines. A current, $I_y$, is applied between end conductors 28 and 29 and the flow of this current is directed to one of the Y lines 23–26 in accordance with the presence of current flow in cryotron grids 30–35. Current in cryotron grid 30, for example, forces $I_y$ into either Y line 25 or 26. Then one of these lines is selected according to whether cryotron grid 33 or 35 is energized, in a manner well known to those skilled in the art.

According to the present invention, a sensing circuit, 36, for example a sensitive high input impedance amplifier, is coupled between end conductors 28 and 29 for the purpose of detecting the output voltage, V, indicating the readout of a binary one in a cell selected with coordinate X and Y lines. This sensing circuit desirably has a threshold of operation so that it is principally sensitive to a voltage, V, as at 16 in FIG. 2 caused by a current 15 in FIG. 2 present when a Y line current and a circulating persistent current coincide and are quenched with X line current as hereinbefore described. The sensing circuit is decoupled during the writing of information with switching means 37 conveniently comprising a cryotron serially inserted between end conductor 28 and sensing circuit 36.

While we have shown and described several embodiments of our invention, it will be apparent to those skilled in the art that many changes and modifications may be made without departing from our invention in its broader aspects; and we therefore intend the appended claims to cover all changes and modifications as fall within the true spirit and scope of our invention.

What we claim as new and desire to secure by Letters Patent of the United States is:

1. A cryogenic memory cell comprising a Y line, a Y line loop circuit comprising a first branch and a second parallel branch of higher inductance than said first branch serially connected with said Y line, an X line, and an X line loop circuit comprising a first branch and a second parallel branch of higher inductance than said first branch serially connected with said Y line, wherein said second branch of said X line loop circuit is disposed in cryotron grid relation to the first branch of said Y line loop circuit, and said Y line is disposed in cryotron grid relation to the first branch of said X line loop circuit.

2. A cryogenic memory cell comprising a first loop circuit having first and second terminals for connective insertion in a first address line of a memory array, said first loop circuit comprising first and second branches extending between said terminals wherein said second branch has greater inductance than said first branch, a second loop circuit having first and second terminals for connective insertion in a second address line of a memory array, said second address line defining the unique location of said memory cell together with said first line, said second loop circuit comprising first and second branches extending between the terminals of said second loop circuit wherein the second branch has greater inductance than the first branch, the second branch of said second loop circuit being disposed in cryotron grid relation to the first branch of said first loop circuit, and the first branch of said second loop circuit being disposed in cryotron gate relation to said first address line.

3. In a cryogenic memory matrix including a plurality of intersecting lines defining unique memory locations at their intersections, a memory cell located at one of said intersections comprising a first branched circuit provided with first and second branches wherein the second of said branches is higher in inductance than the first of said branches, and a second branched circuit having first and second branches wherein the second branch is higher in inductance than the first branch, the second branch of said second branched circuit including a control grid disposed in cryotron relation to the first branch of said first branched circuit and the first branch of said second branched circuit including a controlled gate in cryotron relation to one of said intersecting lines.

4. In a memory matrix including pairs of lines which uniquely determine the address of memory locations thereof, a first line and a second line determining one such address, said first line branching into a first conductor and a second conductor wherein said second conductor has a higher inductance than said first conductor, the second of said lines branching into a third conductor and a fourth conductor wherein the fourth conductor has a higher inductance than the third conductor, said fourth conductor being disposed in cryotron grid relation to said first conductor and said first line being disposed in cryotron grid relation to said third conductor.

5. A memory matrix comprising a plurality of Y lines intersecting a plurality of X lines to define unique memory locations, each of said memory locations comprising a first branched circuit connected in said Y line and a second branched circuit connected in said X line, one of the branches of said second branched circuit being disposed in cryotron grid relation to one of the branches in said first branched circuit, and said Y line at a memory location being disposed in cryotron grid relation with respect to the remaining branch of said second branched circuit, connection means for coupling a current to said Y lines, said one branch of said second branched circuit being of greater inductance than said remaining branch thereof, addressing means for addressing said Y lines disposed between said connection means and said Y lines, a sensing circuit coupled to said Y lines through said addressing circuit for detecting voltage produced in a Y line selected by currents in intersecting X and Y lines, and a switching means for decoupling said sensing means when information is being entered into said memory matrix.

6. A cryogenic memory cell comprising first and second lines uniquely determining the location of said memory cell, a first branched circuit connected in said first line, and a second branched circuit connected in said second line, one of the branches in the said second line overlying one of the branches in said first line in cryotron relation thereto, said first line overlying the remaining branch in said second line in cryotron relation thereto, the remaining branch in said first line being disposed longitudinally along the first branch thereof and across the first mentioned branch of said second line and being of greater inductance than said first branch of said first line.

7. A memory matrix comprising: a plurality of superconductive memory cells arranged in rows and columns, each cell including first and second conductors, said second conductor being disposed in cryotron grid relation to said first conductor, and continuously superconducting means coupled in shunt with said second conductor for maintaining a persistent circulating current in said each cell, said continuously superconducting means being of higher inductance than the portion of said second conductor coupled thereto; means interconnecting the second conductors in each of the respective rows of cells; means coupling said first conductors in each of the respective columns of cells in series; and a signal sensing circuit coupled to said columns of said first conductors for detecting a signal produced in a selected column when the persistent circulating current in one of the cells of said column is quenched.

References Cited

UNITED STATES PATENTS 3,311,898 3/1967 Bremer et al. ------ 340—173.1

BERNARD KONICK, *Primary Examiner.*

J. F. BREIMAYER, *Assistant Examiner.*